United States Patent [19]
Pracas

[11] Patent Number: 6,120,295
[45] Date of Patent: Sep. 19, 2000

[54] VISUAL PUZZLE TOY

[75] Inventor: Victor Manuel Pracas, Waroona WA, Australia

[73] Assignee: Technovation Australia Pty Ltd, Safety Way WA, Australia

[21] Appl. No.: 09/238,045

[22] Filed: Jan. 27, 1999

[30] Foreign Application Priority Data

Jan. 29, 1998 [AU] Australia ............................... PP 1579

[51] Int. Cl.⁷ ..................................................... G09B 11/04
[52] U.S. Cl. .............................. 434/88; 434/81; 446/219; 273/138.1; 40/582; 40/900
[58] Field of Search ............................. 446/219; 472/57, 472/58, 60, 63; 273/157 R, 138.1; 40/582, 900; 434/81, 84, 85, 88

[56] References Cited

U.S. PATENT DOCUMENTS

| | | | |
|---|---|---|---|
| 169,882 | 11/1875 | Adams | 446/219 |
| 1,346,017 | 7/1920 | Goodman | 446/219 |
| 2,387,021 | 10/1945 | Hendershot | 472/58 |
| 3,122,859 | 3/1964 | Reaux, Jr. | 446/219 |
| 3,156,758 | 11/1964 | Tregubenko | 472/63 |
| 3,834,051 | 9/1974 | Barnes, Jr. et al. | 472/63 |
| 4,915,663 | 4/1990 | Magers | 446/219 |
| 5,799,939 | 9/1998 | Schneider | 273/138.1 |

*Primary Examiner*—Sam Rimell
*Attorney, Agent, or Firm*—Larson & Taylor, PLC

[57] ABSTRACT

A visual puzzle toy, for example, a coloring book 14 is provided with a substantially planar surface having a morphologically distorted representation 10 of an image printed thereon. The image 10 is distorted by circular transformation and must be viewed in a reflective surface provided on the outer circumference of a substantially cylindrical object in order to clearly distinguish the original image. The reflective surface may be provided on a cylindrical tumbler 22 for holding pencils, pens and paintbrushes for coloring in the morphologically distorted representation 10. The morphological distortion of the image introduces an element of mystery and intrigue which enhances the play value of the coloring book. The morphologically distorted representation can also be printed on a placemat or a jigsaw puzzle.

7 Claims, 3 Drawing Sheets

VISUAL PUZZLE TOY

FIELD OF THE INVENTION

The present invention relates to a visual puzzle toy in which an image has been distorted by circular transformation to produce a morphologically distorted representation of the image, and relates particularly, though not exclusively, to a colouring book that includes one or more such morphologically distorted representations.

BACKGROUND TO THE INVENTION

Puzzles and novelty toys that rely on optical illusions and/or other visual conundrums seem to remain popular with both children and adults. One example of such a puzzle which has recently been marketed under the trade mark MAGIC EYE are the pictures which when viewed normally typically do not appear to represent anything clearly discernible, but when viewed with the left and right eyes slightly out of focus a 3-D image becomes visible.

It appears that the popularity of such puzzles and novelty toys arises from an innate curiosity and fascination with mystery in human beings. The play value of such puzzles and toys lies principally in the ability to solve the riddle or to uncover the mystery in such a way that does not immediately render the puzzle or toy useless. Having solved the conundrum on one occasion, a user can return to the puzzle or toy on another occasion and still derive enjoyment in solving the conundrum a second, a third, or fourth time.

SUMMARY OF THE PRESENT INVENTION

The present invention was developed with a view to providing a visual puzzle toy that involves the user in solving a visual conundrum.

According to one aspect of the present invention there is provided a visual puzzle toy comprising:

a substantially planar surface having a morphologically distorted representation of an image printed thereon, the image having been distorted by circular transformation to produce said morphologically distorted representation;

a substantially cylindrical object having a reflective surface provided on an outer circumference thereof, wherein when said morphologically distorted representation is viewed in said reflective surface the original image is clearly distinguishable.

In one embodiment said morphologically distorted representation is printed on the page of a colouring book, whereby in order to colour the image in the colouring book the representation must be viewed in the reflective surface.

In another embodiment said morphologically distorted representation is printed on a placemat and said substantially cylindrical object is a drink cup which may be placed on the placemat to view the image.

In a further embodiment said morphologically distorted representation is printed on a jigsaw puzzle, whereby in order to distinguish the original image and reconstruct the jigsaw puzzle the representation must be viewed in said reflective surface. Preferably said cylindrical object is a storage container for said jigsaw puzzle when not in use. Preferably said cylindrical container is provided with a lid having a miniature version of said morphologically distorted representation printed thereon. Advantageously said lid also has a smaller cylindrical tube, with a reflective surface provided on an outer circumference thereof, provided in connection therewith. Preferably said tube is slidably mounted in the lid and can be lifted to a first position in which the miniature version of the morphologically distorted representation can be viewed, and a second position in which substantially the full length of the tube is retracted into the lid.

BRIEF DESCRIPTION OF THE DRAWINGS

In order to facilitate a more detailed understanding of the present invention several embodiments of the visual puzzle toy will now be described in detail, by way of example only, with reference to the accompanying drawings in which.

DETAILED DESCRIPTION OF PREFERRED EMBODIMENTS

Figure 1:
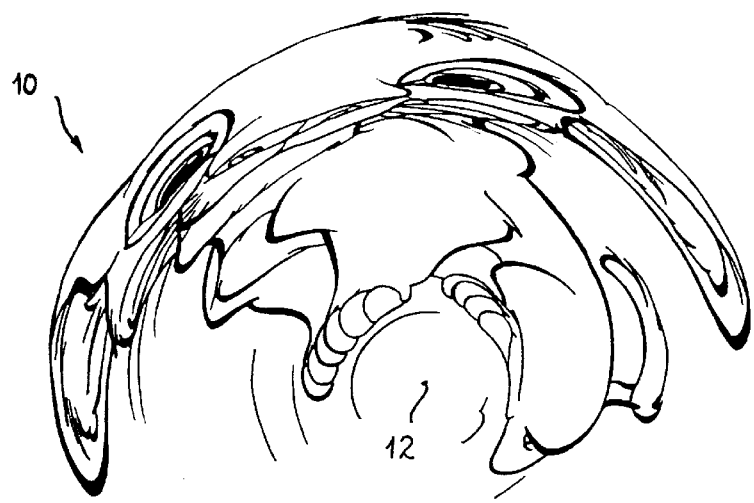
FIG. 1 illustrates a morphologically distorted representation of an image of a lion cub.

A morphologically distorted representation 10 of an image of a lion cub as illustrated in FIG. 1 may be created manually using a grid transposition method. A rectangular grid is drawn on the original image and each portion of the image is then transposed onto the corresponding rectangle in a circular grid. It will be understood that those features of the original image which are closest to the centre of curvature of the circular grid are least distorted, whilst those portions furthest from the centre of curvature are the most distorted. This type of circular transformation can now be performed much more quickly and efficiently on a personal computer using appropriate software. The more complex the original image, the more difficult it is to discern in the morphologically distorted representation. Hence, in FIG. 1 the eyes and ears of the lion cub can just be made out in the morphologically distorted representation, however it is not possible to discern from the representation that the original image is of a lion cub. Therefore, the viewer is intrigued by the mystery and curiosity creates a desire in the viewer to solve the mystery.

In order to solve the mystery, the viewer must place a substantially cylindrical object having a reflective surface provided on an outer circumference thereof at approximately the centre of curvature 12 of the morphologically distorted representation 10. When the morphologically distorted representation 10 is viewed in the reflective surface the original image of the lion cub becomes clearly distinguishable. It will be understood that the circular transformation employed to create the morphologically distorted representation need not employ a constant radius of curvature in order to produce a similar effect. However, in that case the reflective surface of the substantially cylindrical object must also have a radius of curvature which varies in an identical manner if the original image is to be viewed without distortion. Hence, as used throughout the present specification, the term "circular transformation" also includes a substantially circular transformation.

Figure 2:
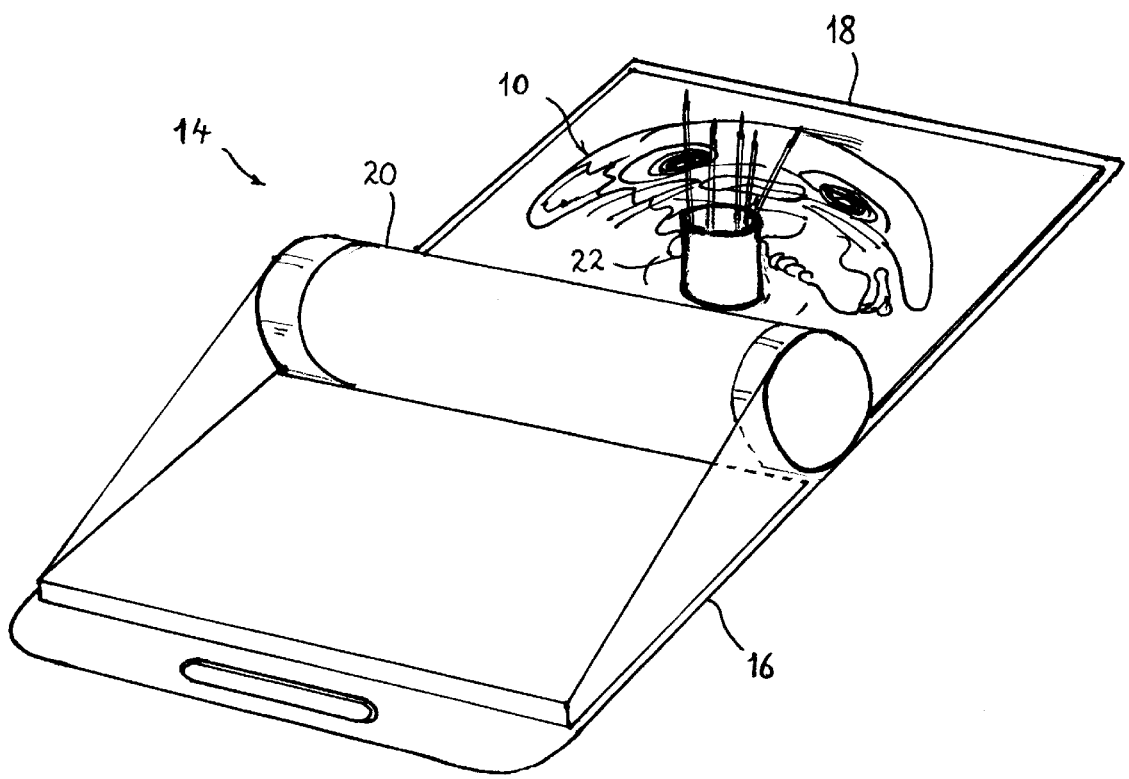
FIG. 2 illustrates a first embodiment of a visual puzzle toy in accordance with the present invention, in the form of a colouring book.

FIG. 2 illustrates a first embodiment of the visual puzzle toy in accordance with the present invention in the form of a colouring book 14. The colouring book 14 is provided with a case 16 made from lightweight moulded plastics material, and having a lid 18 hinged thereto. The lid 18 is pivotally connected to the case 16 by a cylindrical hinge connection 20 which effectively forms one wall of the case. The interior of the hinge connection 20 is hollow and may be used for storage of pencils, paintbrushes and other instruments used for colouring in, such as crayons, etc. The case 16 may be laid open flat on a surface as shown in FIG. 2 so that the lid 18 provides a drawing surface on which a child may colour in pictures provided in the colouring book. Included amongst the pictures in the colouring book is at least one morphologically distorted representation 10, similar to that illustrated in FIG. 1.

In order to discern the original image for the purposes of colouring in, the morphologically distorted representation 10 must be viewed in a suitable reflective surface. In this embodiment, a cylindrical tumbler 22 is provided for holding pencils, pens, brushes, etc., and which is provided with a reflective surface on an outer circumference thereof. Pencil tumbler 22 is placed on the page of the colouring book at approximately the location of the centre of curvature 12. In this position, the original image of a lion cub can be viewed in the reflective surface on tumbler 22 and the child can then commence colouring in the corresponding parts of the morphologically distorted representation. The child will need to continue to refer to the original image as reflected in the reflective surface of tumbler 22 in order to correctly colour in the various parts of the morphologically distorted representation.

Preferably, the outside diameter of the pencil tumbler 22 is sufficiently small for the tumbler 22 to be received within the hollow confines of the hinge connection 20 during storage.

Figure 3:
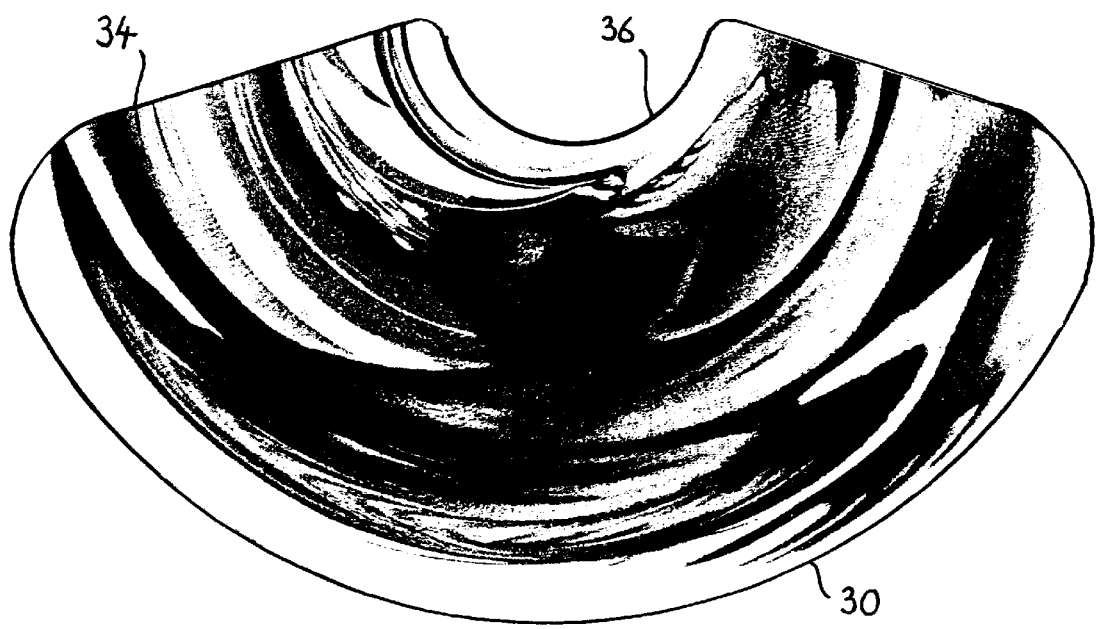
FIGS. 3 and 4 illustrate a second embodiment of a visual puzzle toy in the form of a placemat and cup; and, FIGS. 5, 6 and 7 illustrate a third embodiment of a visual puzzle toy in the form of a jigsaw puzzle.
Figure 4:
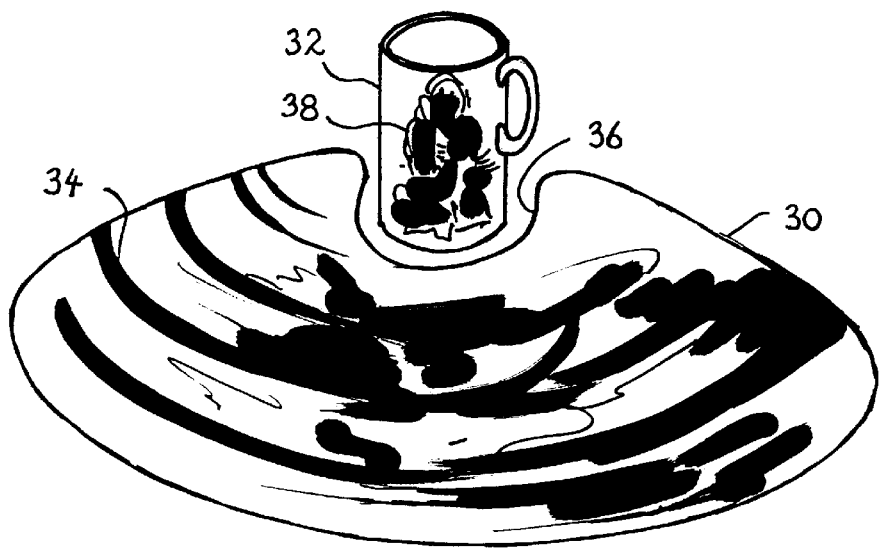

FIGS. 3 and 4 illustrate a second embodiment of the visual puzzle toy in accordance with the present invention, in the form of a placemat 30 with cup 32. A morphologically distorted representation 34 is printed on the placemat 30. In this embodiment the placemat 30 is sector-shaped and the representation 34 therefore takes up substantially the whole of the surface area of the placemat 30. A cut-out portion 36 is provided on one side of the placemat 30 to receive a cup 32 as shown in FIG. 4. Cup 32 is of substantially cylindrical shape and has a reflective surface provided on an outer circumference thereof. Hence, when the cup 32 is placed within the cut-out portion 36 the morphologically distorted representation 34 can be viewed in the reflective surface so that the original image 38 is clearly distinguishable.

Figure 5:
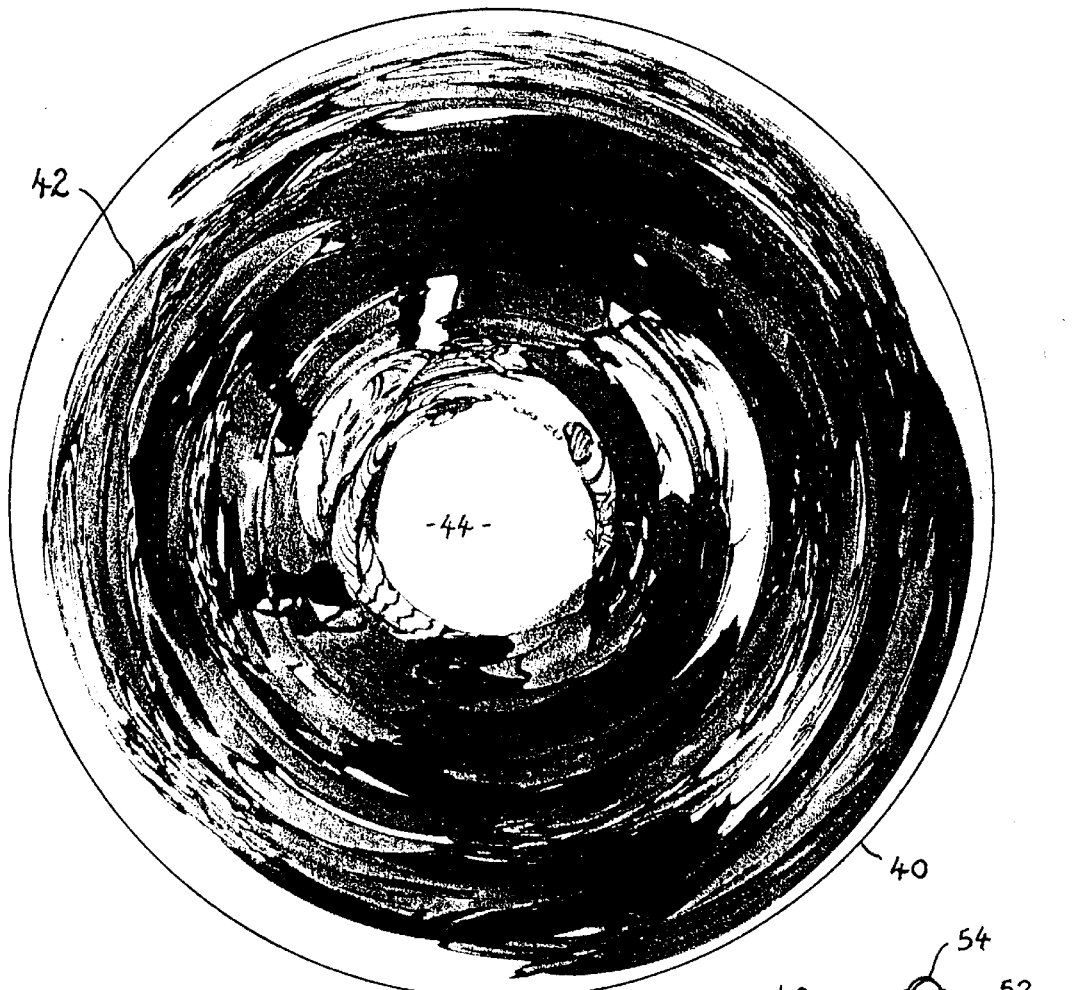
Figure 6:
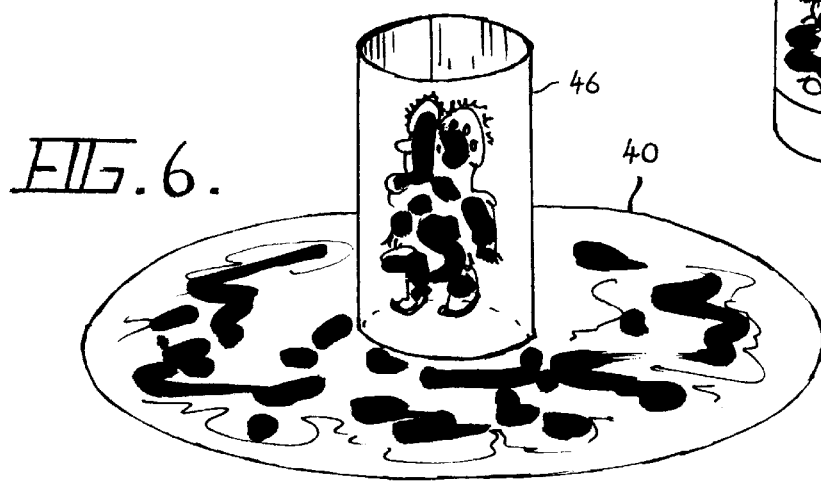
Figure 7:
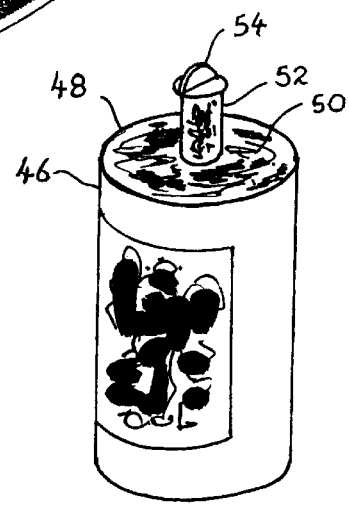

FIGS. 5 to 7 illustrate a third embodiment of the visual puzzle toy in accordance with the present invention, in the form of a jigsaw puzzle 40. Jigsaw puzzle 40 may be manufactured from cardboard, wood or other suitably rigid material and has a morphologically distorted representation 42 printed thereon as shown most clearly in FIG. 5. Jigsaw puzzle 40 is of circular configuration and is cut into small interlocking pieces (not visible) in a conventional manner. The morphologically distorted representation 42 is of annular shape with a blank circular portion 44 provided in the centre of the puzzle.

In its unassembled condition, the puzzle pieces are stored in a storage container 46 illustrated in FIG. 7. Storage container 46 is of substantially cylindrical shape and is provided with a reflective surface on an outer circumference thereof. Hence, when the container 46 is placed on the circular portion 44 of the puzzle 40, the morphologically distorted representation 42 can be viewed from all angles in the reflective surface to reveal the original image. Storage container 46 is preferably provided with a lid 48 which has a miniature version 50 of the morphologically distorted representation printed thereon. In addition, the lid 48 has a small cylindrical tube 52 slidably mounted therein which can be lifted to a first position as shown in FIG. 7. The tube 52 is also provided with a reflective surface on an outer circumference thereof so that when the miniature version of the morphologically distorted representation is viewed therein, the original image is clearly discernible. Advantageously the slidable tube 52 can be pushed down to a second position in which substantially the full length of the tube is retracted into the lid. A small finger grip 54 is provided on top of the tube 52 to enable the tube 52 to be lifted to its first position. Hence, tube 52 provides a simple yet effective "try me" feature incorporated in the storage container 46 of the jigsaw puzzle.

Jigsaw manufacturers are always looking for ways of making jigsaw puzzles more challenging and interesting. The present invention introduces a new element of mystery for the user, who must not only successfully assemble all of the jigsaw puzzle pieces but must also view the resultant representation in the reflective surface of the storage container 46 in order to view the original image. Naturally, the morphologically distorted representation can also be viewed whilst the jigsaw puzzle 40 is being assembled in order to aid the user.

Now that several embodiments of the visual puzzle toy in accordance with the invention have been described in detail, some of the commercial benefits will be apparent, including the following:

(i) the use of a morphologically distorted representation introduces an additional element of mystery and intrigue which enhances the play value of the toy;

(ii) the separate parts of the toy are simple and inexpensive to manufacture; and, (iii) the manner in which the cylindrical object with reflective surface must be placed in relation to the morphologically distorted representation adds a dimension of interest and involvement for the user.

Numerous variations and modifications to the described embodiments will suggest themselves to persons skilled in the relevant arts, in addition to those already described, without departing from the basic inventive concepts. For example, the substantially cylindrical object on which a reflective surface is provided need not be provided in the form of a cylinder. Instead, a sheet of flexible material having a reflective surface provided thereon may be bent into the shape of a cylinder and held in position in relation to the morphologically distorted representation in order to view the original image. All such variations and modifications are to be considered within the scope of the present invention, the nature of which is to be determined from the foregoing description and the appended claims.

What is claimed is:

1. A visual puzzle toy comprising:
    a coloring book having a page with a morphologically distorted representation of an image printed thereon, the image having been distorted by circular transformation to produce said morphologically distorted representation; and
    a substantially cylindrical tumbler for holding pencils and the like having a reflective surface provided on an outer circumference thereof, wherein when said morphologically distorted representation is viewed in said reflective surface the original image is clearly distinguishable thereby enabling the image in the coloring book to be colored; and
    wherein said coloring book is provided in a case having a lid pivotally connected thereto by a hinge connection, and wherein the case may be laid open flat so that the lid forms a drawing surface on which a child may color in pictures provided in the coloring book.

2. A visual puzzle toy as defined in claim 1, wherein said hinge connection has a hollow interior and can be used for the storage of pencils, pens, paintbrushes and other instruments for colouring in pictures.

3. A visual puzzle toy comprising:

a jigsaw puzzle including a substantially planar surface having a morphologically distorted representation of an image printed thereon, the image having been distorted by circular transformation to produce said morphologically distorted representation, and a substantially cylindrical object having a reflective surface provided on an outer circumference thereof, whereby in order to clearly distinguish the original image and reconstruct the jigsaw puzzle the morphologically distorted representation must be viewed in said reflective surface.

4. A visual puzzle toy as defined in claim 3, wherein said cylindrical object is a storage container for said jigsaw puzzle when not in use.

5. A visual puzzle toy as defined in claim 4, wherein said cylindrical container is provided with a lid having a miniature version of said morphologically distorted representation printed thereon.

6. A visual puzzle toy as defined in claim 5, wherein said lid also has a smaller cylindrical tube, with a reflective surface provided on an outer circumference thereof, provided in connection therewith.

7. A visual puzzle toy as defined in claim 6, wherein said tube is slidably mounted in the lid and can be lifted to a first position in which the miniature version of the morphologically distorted representation can be viewed, and a second position in which substantially the full length of the tube is retracted into the lid.

* * * * *